(12) United States Patent
Isenberg et al.

(10) Patent No.: US 11,580,571 B2
(45) Date of Patent: Feb. 14, 2023

(54) MATCHING REVIEWS BETWEEN CUSTOMER FEEDBACK SYSTEMS

(71) Applicant: LMP Software, LLC, Woodland Hills, CA (US)

(72) Inventors: Henri J. Isenberg, Los Angeles, CA (US); Ronald B. Laughton, Oak Park, CA (US)

(73) Assignee: LMP Software, LLC, Woodland Hills, CA (US)

( * ) Notice: Subject to any disclaimer, the term of this patent is extended or adjusted under 35 U.S.C. 154(b) by 0 days.

(21) Appl. No.: 15/391,176

(22) Filed: Dec. 27, 2016

(65) Prior Publication Data

US 2017/0228763 A1    Aug. 10, 2017

Related U.S. Application Data

(60) Provisional application No. 62/291,326, filed on Feb. 4, 2016.

(51) Int. Cl.
*G06Q 30/02* (2012.01)
*G06Q 30/0242* (2023.01)
*G06Q 30/0282* (2023.01)

(52) U.S. Cl.
CPC ..... *G06Q 30/0243* (2013.01); *G06Q 30/0282* (2013.01)

(58) Field of Classification Search
USPC ....... 705/1.1, 26, 7.33, 14.42; 707/772, 724, 707/748; 379/93.24; 726/3; 709/206; 715/733; 706/12
See application file for complete search history.

(56) References Cited

U.S. PATENT DOCUMENTS

| | | | | |
|---|---|---|---|---|
| 7,917,754 B1* | 3/2011 | Harrison | ............... | H04L 63/126 713/168 |
| 8,635,172 B1* | 1/2014 | Buryak | ............... | G06K 9/6262 706/12 |
| 8,817,959 B1* | 8/2014 | O'Hanlon | ............ | H04M 11/066 379/88.13 |
| 9,401,947 B1* | 7/2016 | Oztaskent | ............... | H04L 67/02 715/733 |
| 2004/0103017 A1* | 5/2004 | Reed | .................. | G06Q 10/0637 705/14.42 |
| 2006/0004595 A1* | 1/2006 | Rowland | ................ | G06Q 10/06 705/1.1 |
| 2007/0112614 A1* | 5/2007 | Maga | ..................... | G06Q 30/02 705/7.33 |
| 2008/0270209 A1* | 10/2008 | Mauseth | ............ | G06Q 30/0201 705/7.29 |
| 2009/0210444 A1* | 8/2009 | Bailey | .................... | G06Q 30/02 709/206 |

(Continued)

*Primary Examiner* — Lynda Jasmin
*Assistant Examiner* — Kimberly L Evans
(74) *Attorney, Agent, or Firm* — SoCal IP Law Group LLP; Mark Andrew Goldstein

(57) ABSTRACT

A system and methods for evaluating whether a public review matches another review is disclosed. The method includes obtaining a private review and a public review of a business. A likelihood the public review matches the private review is evaluated. The evaluation includes evaluating a match distance between text bodies, reviewer names, review dates and ratings in the public review and the private review. Evaluation rules are applied to determine the likelihood of a match.

16 Claims, 10 Drawing Sheets

(56) References Cited

U.S. PATENT DOCUMENTS

| | | | |
|---|---|---|---|
| 2009/0249445 A1* | 10/2009 | Deshpande | G06F 16/9566 726/3 |
| 2013/0046706 A1* | 2/2013 | Keerthi | H04L 67/22 705/347 |
| 2014/0082021 A1* | 3/2014 | Hendrey | G06F 16/24558 707/772 |
| 2015/0161686 A1* | 6/2015 | Williams | G06Q 30/0282 705/347 |
| 2015/0248436 A1* | 9/2015 | Podemsky | H04L 67/54 707/724 |
| 2016/0300023 A1* | 10/2016 | Leonard | G06F 16/322 707/748 |
| 2017/0046390 A1* | 2/2017 | Jain | G06F 17/30477 |

* cited by examiner

MATCHING REVIEWS BETWEEN CUSTOMER FEEDBACK SYSTEMS

RELATED APPLICATION INFORMATION

This patent claims priority from U.S. provisional patent application 62/291,326 filed Feb. 4, 2016, the contents of which are incorporated by reference herein.

NOTICE OF COPYRIGHTS AND TRADE DRESS

This patent document contains material which is subject to copyright protection. This patent document may show and/or describe matter which is or may become trade dress of the owner. The copyright and trade dress owner has no objection to the reproduction by anyone of the patent disclosure as it appears in the Patent and Trademark Office patent files or records, but otherwise reserves all copyright and trade dress rights whatsoever.

BACKGROUND

Field

This disclosure relates to multiple field text content matching which is particularly applicable in the area of online reviews and customer feedback identification.

Description of the Related Art

Online reviews can have a serious impact on businesses of all kinds, from dentists and painters to lawyers and manicurists as well as restaurants and tutors. In recent years, reviews online have gained a great deal of ground. Customers turn to these online reviews to tell them where to go, and where not to go, which businesses to trust, and which to avoid. When a customer wants to purchase a product, receive a service, or find a business, they turn to the Internet as their guide. Online business reviews have become a key source of information on which customers reference to make purchasing decisions.

With the number of business review sites growing significantly each year, online reviews have the power to dramatically impact a business. Increasing the numbers of reviews posted about a business is important to increasing the number of customers and the amount of business transacted. Businesses incorporate multiple methods to increase the number of reviews posted online. However it is difficult to determine which posted reviews result from a particular marketing method or business generation campaign. This is also made complex because reviews online reside on multiple sites from an ever-growing stable of review sites. A system to identify and evaluate a review to determine its original source can be used to evaluate the effectiveness of a particular marketing method or business generation campaign. This evaluation can allow a business to determine if its marketing budget was invested wisely and if a third party providing the marketing method or business generation campaign should be rehired.

DETAILED DESCRIPTION

A system and methods to Identify and evaluate a publically accessible online review to determine its original source is described herein. The system and methods can be used to evaluate the effectiveness of a particular marketing method or business generation campaign.

Environment

Figure 1:
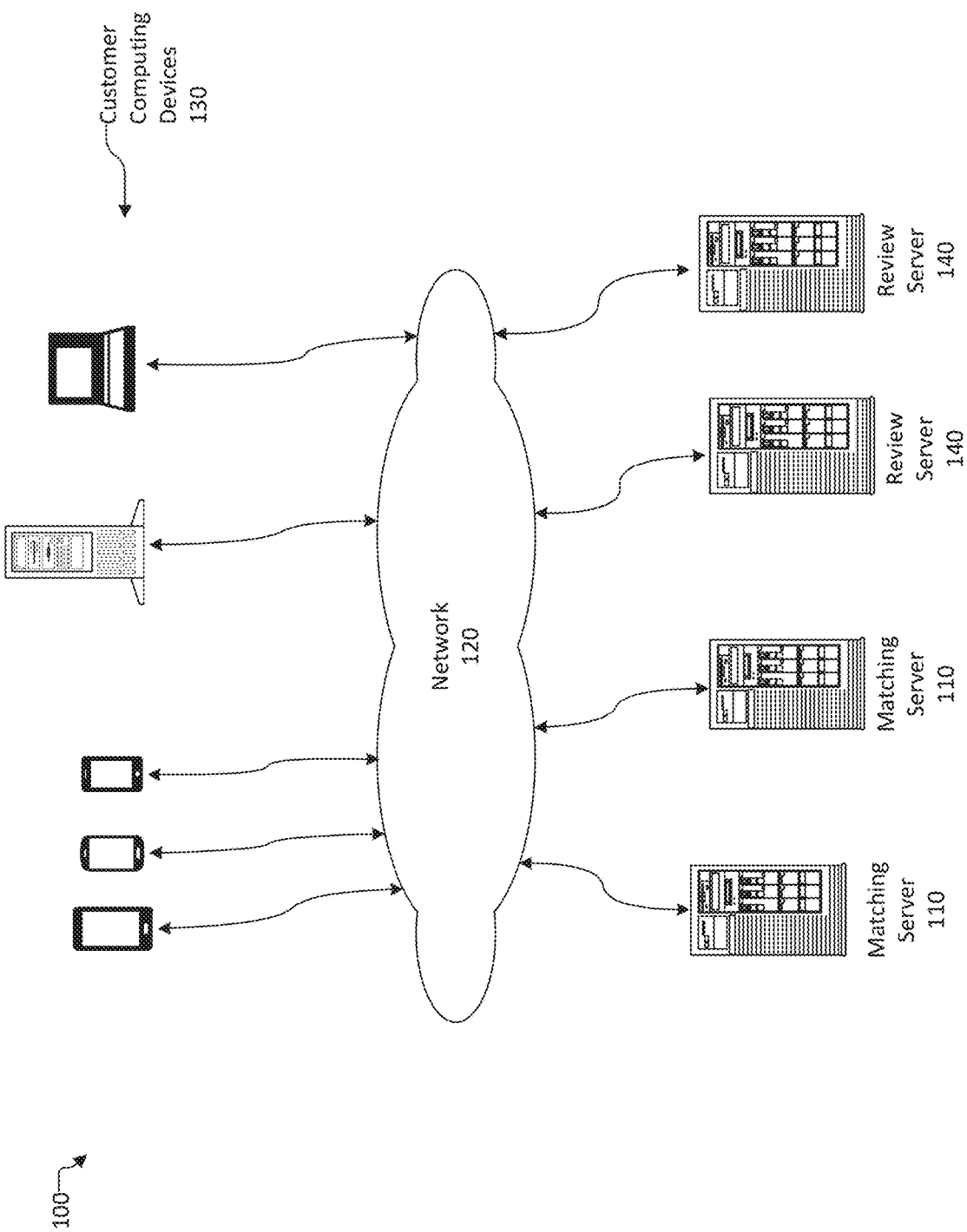
FIG. 1 is a block diagram of an environment in which the matching system and methods described herein is implemented.

Referring now to FIG. 1, there is shown a block diagram of an environment 100 in which a matching system and methods described herein is implemented. The methods described herein may be implemented on one or more server computers referred to herein as matching servers 110. A server computer includes software and hardware for providing the functionality and features described herein. A server computer may include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The methods, functionality and features described herein may be embodied in software which operates on a server computer and may be in the form of firmware, an application program, an applet (e.g., a Java applet), a browser plug-in, a COM object, a dynamic linked library (DLL), a script, one or more subroutines, or an operating system component or service. The software may maintain a database of information about businesses and their customers. The database may be implemented using the structured query language more commonly known as SQL or MySQL as well as other database software. The hardware and software and their functions may be distributed such that some are performed by one server computer and others by other server computers. The server and the software may access third party review servers 140 via application interfaces (API's) made publically accessible by third party review companies.

Although shown and described as implemented in a server computer, the processes may be implemented with any computing device. A computing device as used herein refers to any device with a processor, memory and a storage device that executes instructions including, but not limited to, personal computers, server computers, computing tablets, smart phones, portable computers, and laptop computers.

These computing devices may run an operating system, including, for example, variations of the Linux, Microsoft Windows, and Apple Mac operating systems.

The techniques may be implemented in software and stored on a machine readable storage medium in a storage device included with or otherwise coupled or attached to a matching server 110 or other computing device. That is, the software may be stored on machine readable storage media. These storage media include magnetic media such as hard disk drives (HDDs); optical media such as compact disks (CD-ROM and CD-RW) and digital versatile disks (DVD and DVD±RW); silicon media such as solid-state drives (SSDs) and flash memory cards; and other magnetic, optical or silicon storage media. As used herein, a storage device is a device that allows for reading and/or writing to a storage medium. Storage devices include hard disk drives, DVD drives, SSDs, flash memory devices, and others.

The matching servers 110 communicate through a network 120 with customer computing devices 130 and third party review servers 140. The functionality of matching servers 110, with customer computing devices 130 and third party review servers 140 is described below with regard to the flow charts shown in FIGS. 2 through 7. The network 120 comprises one or more public and/or private data networks, and other networks and sub-networks, and may include or be the Internet. The network 120 may also include or access cellular telephone and land line telephone networks. The network 120 includes additional devices, not shown, such as routers, switches, firewalls, multiplexors and other networking equipment that enable and enhance network communications. Additional specialized servers such as application servers, database servers, and others may be coupled with or included with the matching servers 110 and/or the third party review servers 140.

Description of Processes

When a customer visits a business, the business may wish to learn how it performed. To do this, after a customer visits a business, the business may request that the customer leave feedback about the service provided and/or product purchased. The feedback may be left in the form of a private communication such as an email note or in a public space maintained by or on behalf of the business, such as a customer review web page or portion of a website. Feedback may also be left by customers in the form of a review on third party review websites such as TRUSTLINK.ORG, GOOGLE.COM/MAPS, FACEBOOK.COM, and many others. Third party review servers 140 provide the third party review websites.

As used herein the term "business" means any provider of a good or service, including, for example, without limitation, oil change centers, automobile mechanics, car tire centers, car sellers, medical doctors, optometrists, dentists, acupuncturists, accountants, house painters, house cleaners, tutors, repairmen, website designers, handymen, restaurants, diners, bakeries, coffee shops, and many others. The term "customer" means a patron, patient, client, or other recipient of a good or service provided by or obtained from a business.

To increase and improve its customer feedback, businesses may retain a company to institute a customer involvement campaign. The company will have access to and/or maintain communications with customers on behalf of the business, such as by electronic mail and text messaging. The company will have access to and/or maintain a website on behalf of the business, including maintaining a customer feedback portion of the business's website. The company may employ a system like that described herein to request private, public and online reviews from customers of the business. The company may use the system described herein to evaluate its success by evaluating the customer reviews for the business.

Figure 2:
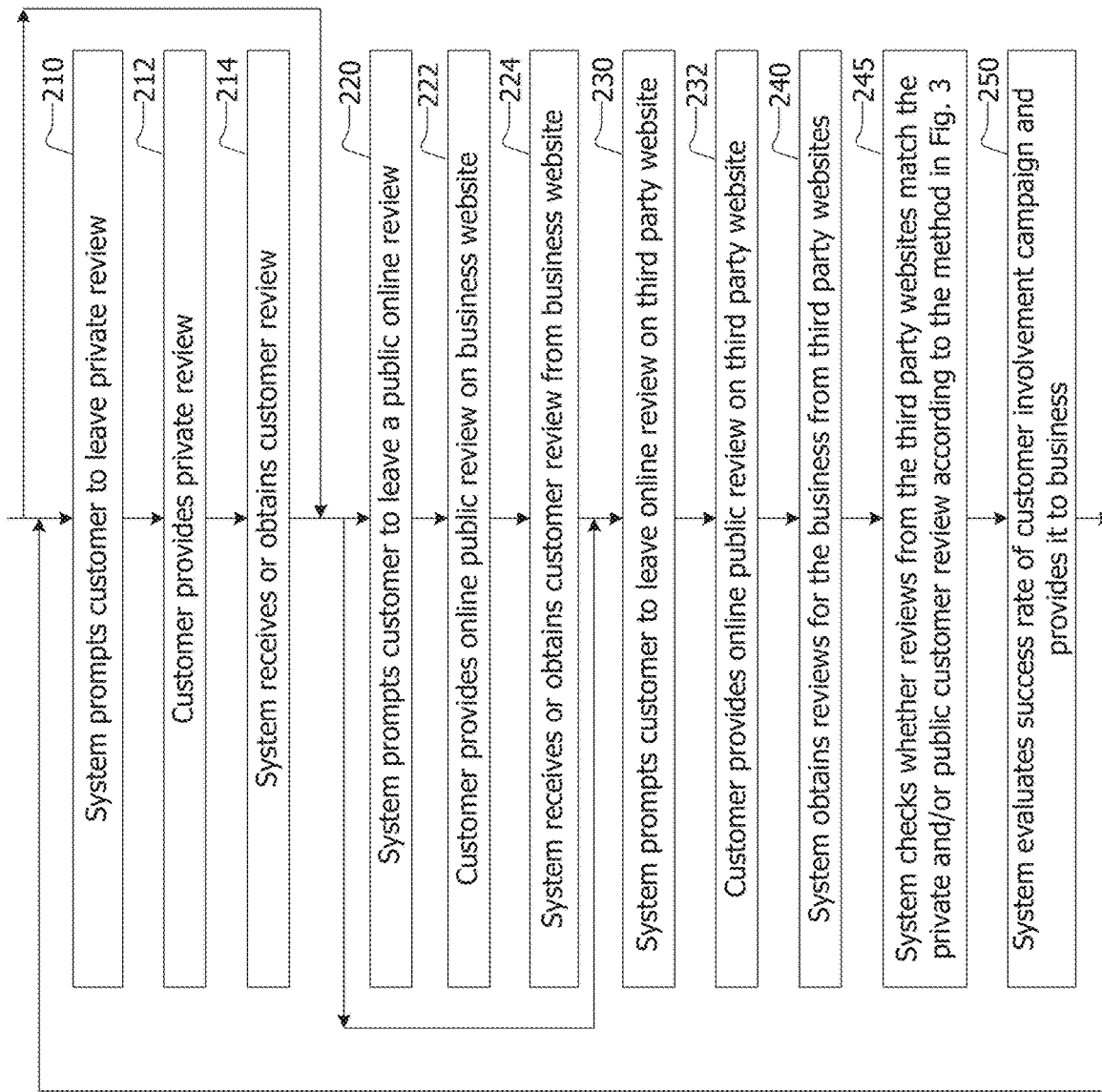
FIG. 2 is a flow chart of action taken to request and receive private, public and online reviews.
Figure 8C:
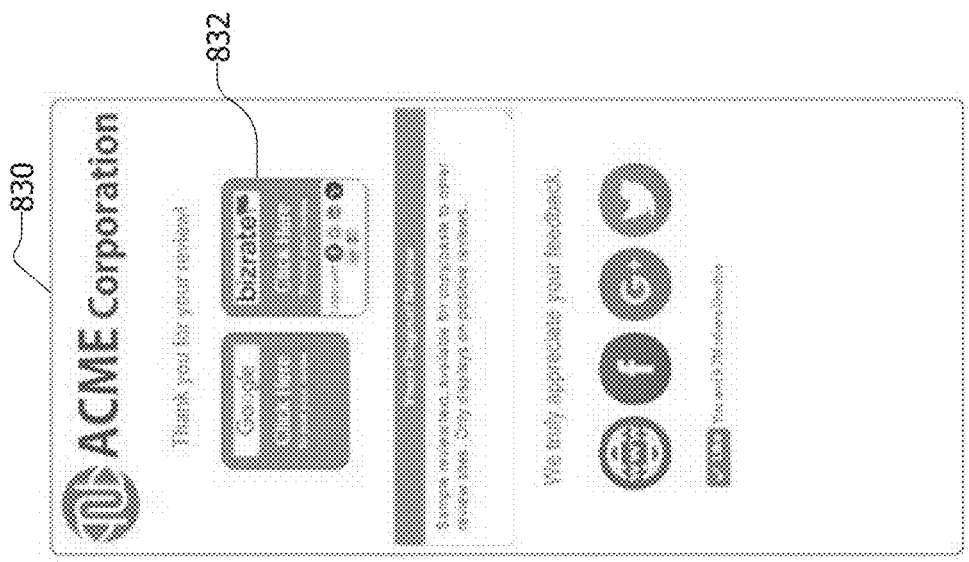
FIGS. 8A, 8B, and 8C are example prompt email notes sent to customers and an example web page.
Figure 8B:
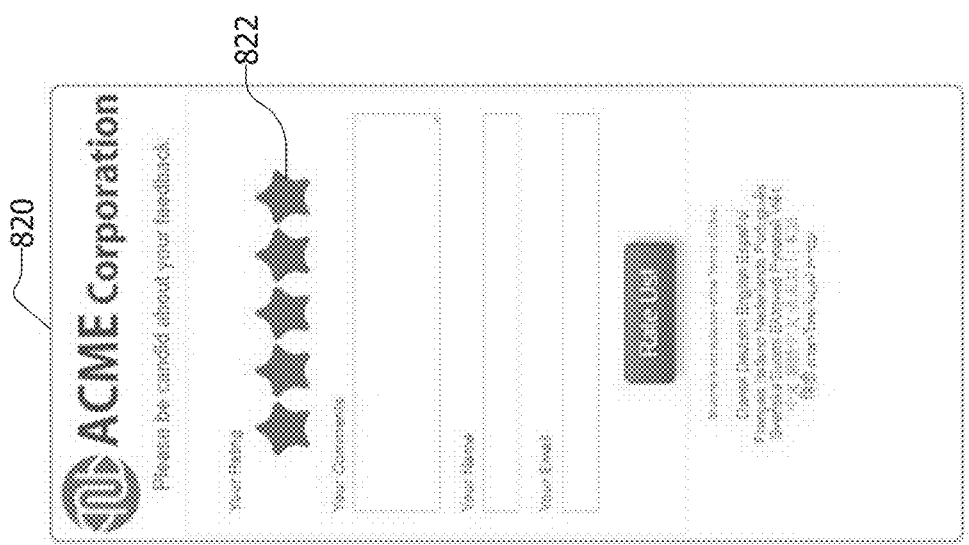
Figure 8A:
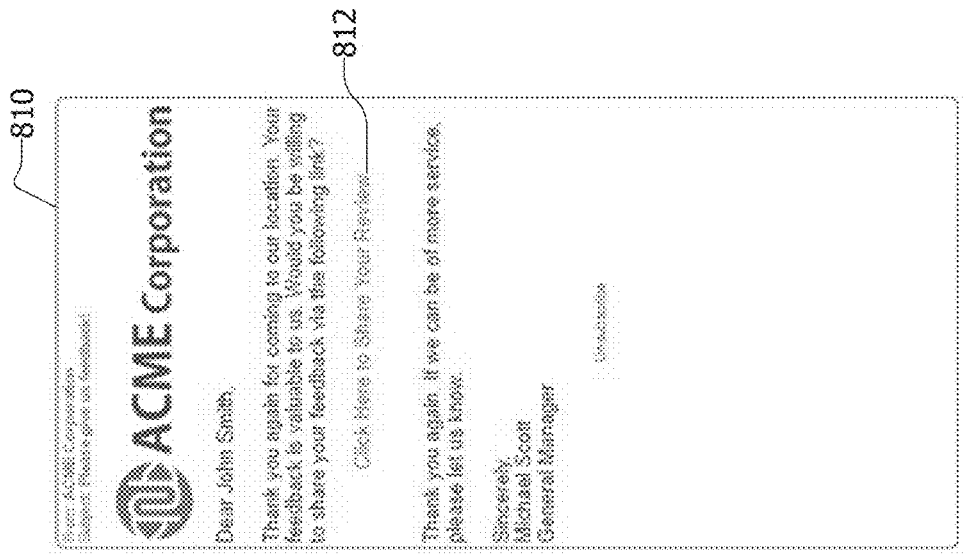
Figures 9A, 9B:
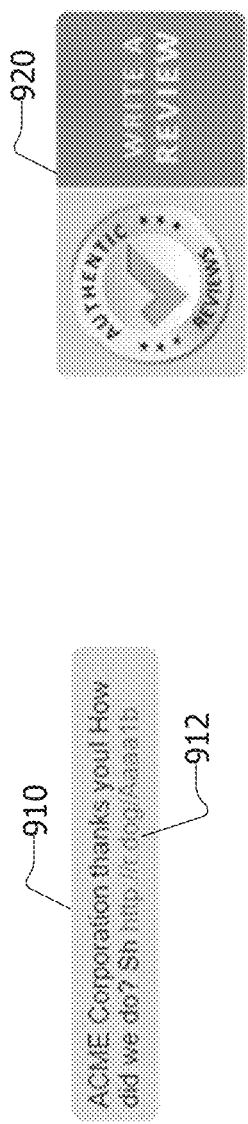
FIGS. 9A and 9B are example prompts sent to or made available to a customer.

Referring now to FIG. 2 a flow chart showing the actions taken to request and receive private feedback and public online reviews is provided. After a company is retained by a business to increase and improve its customer reviews, the company may employ a system to request and receive private feedback, and public online reviews. The system described herein is incorporated in or includes the matching servers 110 described above and shown in FIG. 1. The system prompts a customer to leave a private review, as shown in block 210. The system may send the prompt by email, text message or other similar electronic communication. Example email 810 shown in FIG. 8A is a sample prompt email note sent to a customer. Example text message 910 shown in FIG. 9A is a sample text message prompt sent to a customer. The prompt includes a link that directs the customer to an online form available on a server maintained by the company on behalf of the business or invokes the customer's email program. The email link may cause the customer's computing device email program to create a prepared form email to the business containing text prompting the customer to provide information about a visit, experience or purchase including the date, overall rating and text review of the business. This link may be included in text or a graphic, and is shown by element 812 of email 810 in FIG. 8A and 912 of text message 910 in FIG. 9A.

The system sends the prompt after the customer has made a purchase from or received a service from a business, during which time the customer provided authorization to the business to contact the customer by email and/or text message to receive feedback. In response, a number of customers will provide a review by electronic email, text message or online website via a customer computing device 130 shown in FIG. 1. The customer provides a private review, as shown in block 212. This is achieved by the customer clicking on a link provided in the prompt. The prompt may direct the customer to fill an online form available on a server maintained by the company on behalf of the business or invoke the customer's email program to provide private feedback. The system receives or obtains the customer review, as shown in block 214. The system also stores the date and time the customer clicked on the link in the prompt in a database along with the customer review, which includes the name of the customer, a rating provided by the customer and text body of the actual review. In some circumstances only a rating is left by a customer without a text review, and, as such, no text body is stored. The actions in blocks 210, 212 and 214 may be taken prior to the actions in blocks 230, 231, and 232. Alternatively, in some implementations, the actions in block 210, 212 and 214 are optional and may not be performed such that the method begins at block 220.

Referring now to block 220, the system prompts a customer to leave a public online review on the business's website, as shown in block 220. The system may send the prompt by email, text message or other similar electronic communication to a customer computing device 130. Example email 810 shown in FIG. 8A is a sample prompt email note sent to a customer. The prompt may be also sent by text message 910 shown in FIG. 9A or other electronic communication. The prompt includes a link (812 and 912 shown in FIGS. 8A and 9A) which take the customer to a review web page on the website of the business. This link may be included in text or a graphic. An example review web page as displayed on a mobile device is shown by 820 in FIG. 8B. Further, a graphic on a web page of a website maintained by or for the business may include a link that allows a review to be left on a web page of a website maintained by or for the business. An example graphic having such a link is shown as graphic 920 in FIG. 9B. In response to a prompt or on their own volition clicking on a graphic on a web page of the business, a certain number of customers will provide a review online at the business's publically viewable website. The customer provides the online public review on the business's website, as shown in block 222. The system receives or obtains the customer review from the business's website, as shown in block 224. The system also stores the date and time the customer clicked on the link in the prompt in a database along with the customer review, which includes the name of the customer, a rating provided by the customer and text body of the actual review. In some circumstances only a rating is left by a customer without a text review, and, as such no text body is stored. In one embodiment, a private review is published on the website of the business, and in this embodiment blocks 220, 222 and 224 are skipped. Alternatively, in another embodiment, blocks 220, 222 and 224 are skipped.

Figure 10:
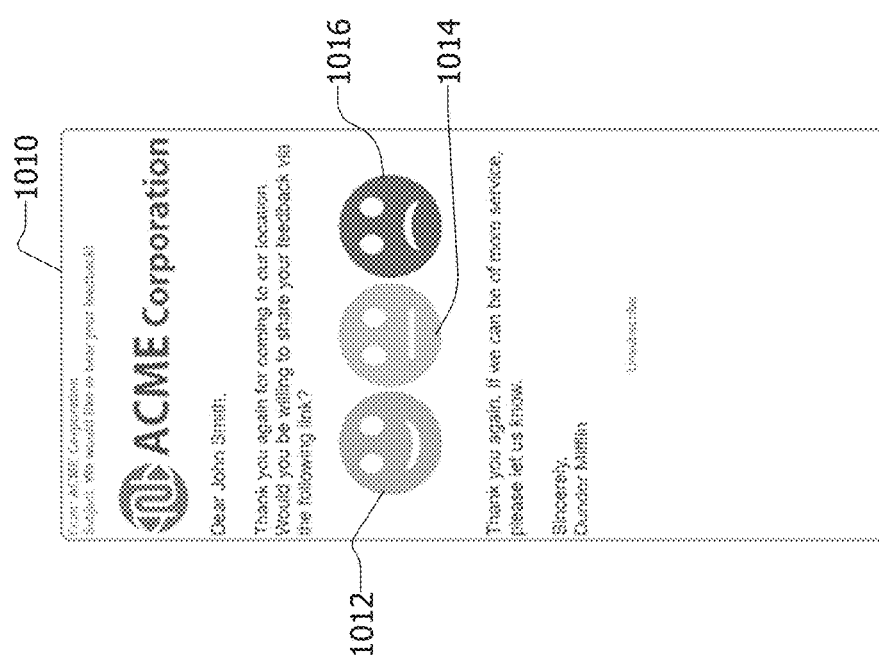
FIG. 10 is an example prompt email note with multiple embedded links.

After recognizing that a customer a provided a review about the business either privately per blocks 210, 212 and 214 and/or publically on the business's website per blocks 220, 222 and 224, the system prompts a customer to leave a public online review on a third party website, as shown in block 230. The system may send the prompt by email, text message or other similar electronic communication to a customer computing device 130. Example email 830 shown in FIG. 8C is a sample prompt email note sent to a customer. A similar prompt may be sent by text message or other electronic communication. The prompt includes a link which will take the customer to a third party review website, and the link may be configured take the customer to a web page for the business at a third party review website. This link may be included in text or a graphic, and is shown by element 832 of email 830. The link when clicked, records the click destination, meaning the specific public review site, and the date/time in a database. In another embodiment, a prompt may provide the option for the customer to select a rating such as on a star scale shown in 820 of FIG. 8B and various facial expression graphics of email prompt 1010 in FIG. 10. Each of the facial expressions—smile 1012, flat 1014 and frown 1016—shown in email prompt 1010 in FIG. 10 may have different links associated with them such that a prepopulated review at a third party website is created in response to a customer selecting one of the facial expressions. This same kind of multiple link and related prepopulated review rating on a third party review website may be incorporated with a star system 822 like that shown in web page 820 of FIG. 8B.

The third party review website is maintained by third party review web servers 130 described above. Returning back to FIG. 2, in response to a prompt, a number of customers provide a public review online at a third party website, as shown in block 232. The system periodically obtains reviews from third party review websites, as shown in block 240. In one embodiment only reviews of businesses retained by the company are obtained and stored temporarily in a database maintained by the system. The system maintains one or more databases, for example one or more databases for reviews obtained from third party review websites and one or more databases for customer reviews sent to businesses or placed on websites of businesses. The system then checks whether reviews from the third party websites match the private and/or public customer reviews according to the method in FIG. 3, as shown in block 245. This is achieved in part by the system accessing information stored temporarily in the databases maintained by the system. Only reviews on third party websites that match the business's address and name are evaluated. That is, the system identifies the business on third party review websites and then identifies in one of its databases or obtains the reviews for the business, selecting those with matching business name and address for evaluation according to the methods described herein. The system evaluates the success rate of its customer involvement campaign and provides it to the business, as shown in block 250.

Figure 3:
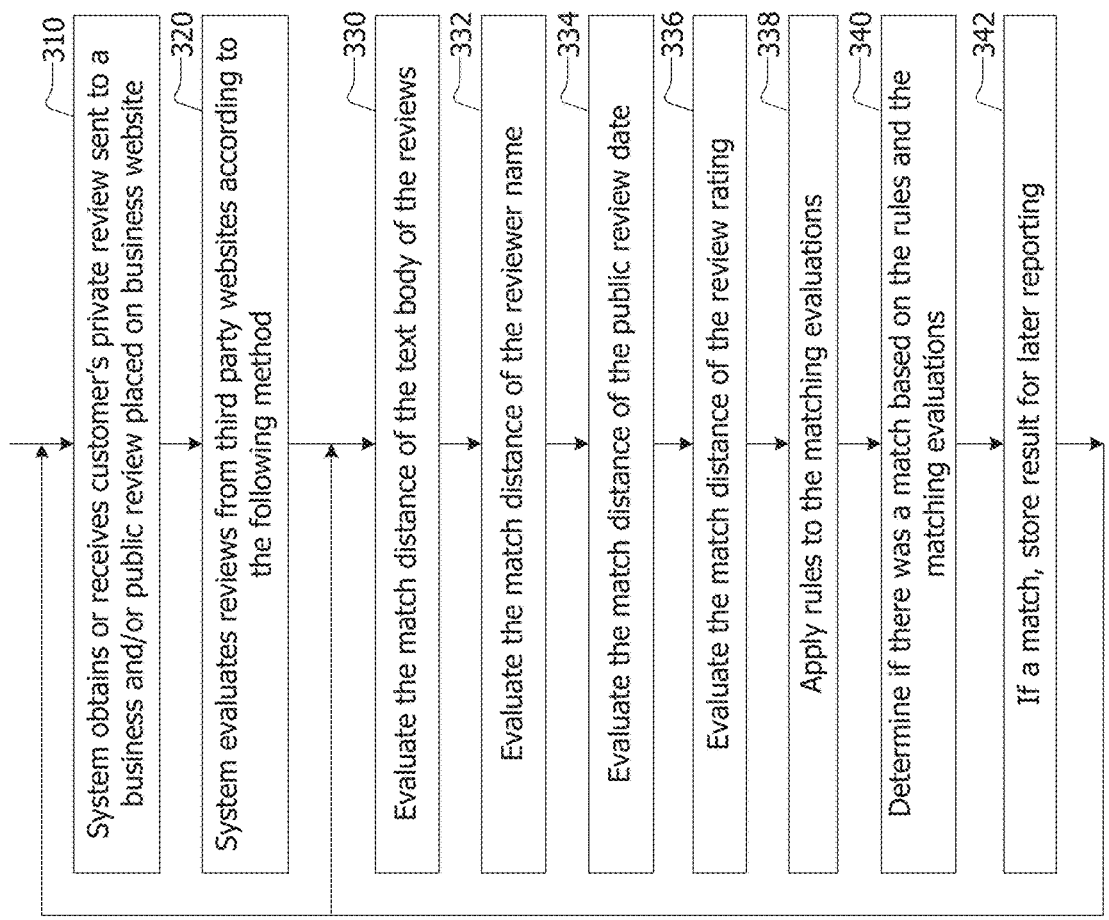
FIG. 3 is a flow chart of the actions taken to evaluate the similarity of two reviews.
Figure 4:
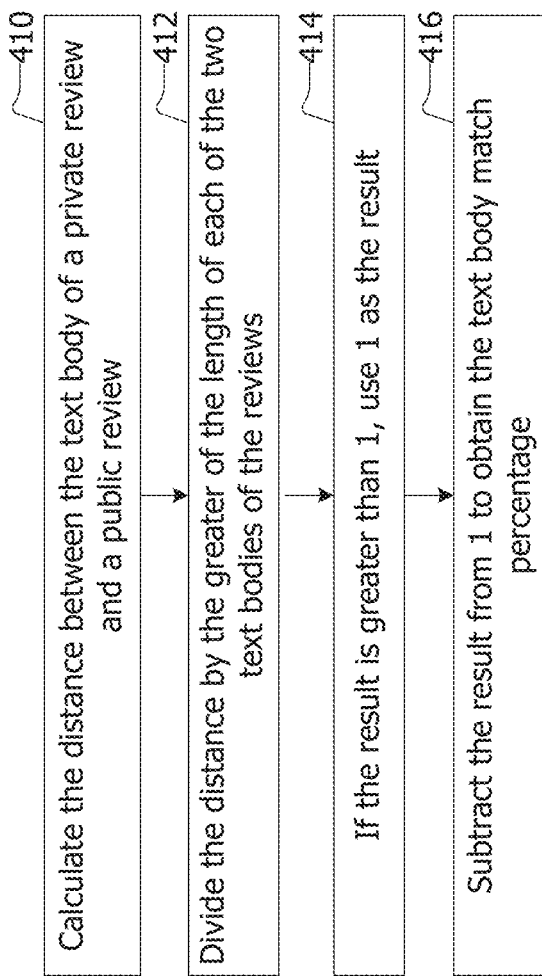
FIG. 4 is a flow chart of the actions taken to evaluate the likelihood of whether the body text of a public review matches the body text of a private review.
Figure 5:
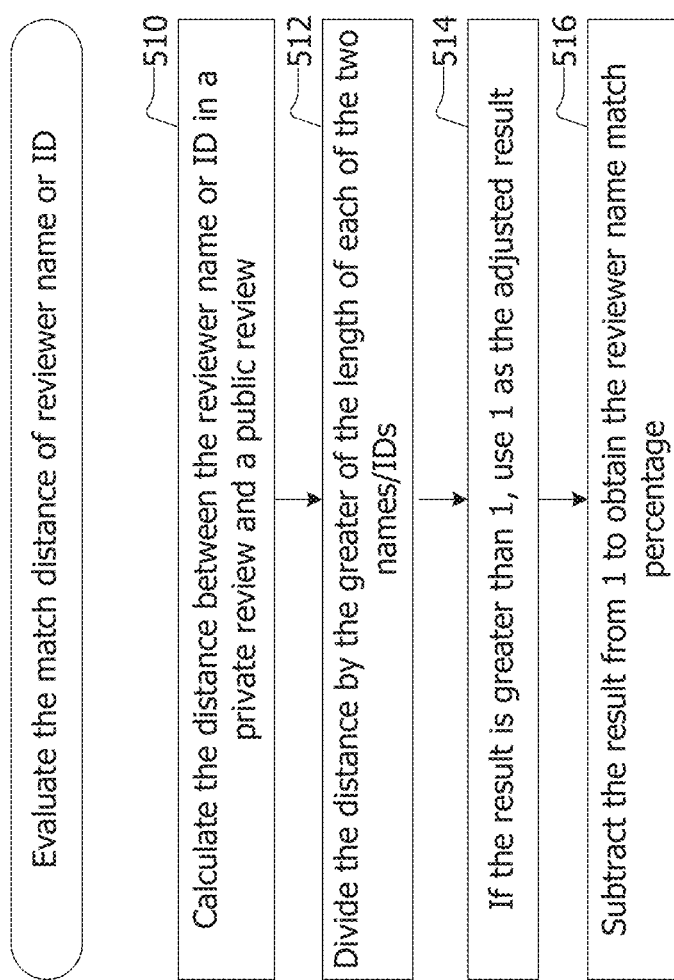
FIG. 5 is a flow chart of the actions taken to evaluate the likelihood of whether the reviewer name in a public review matches the reviewer name of a private review.
Figure 6:
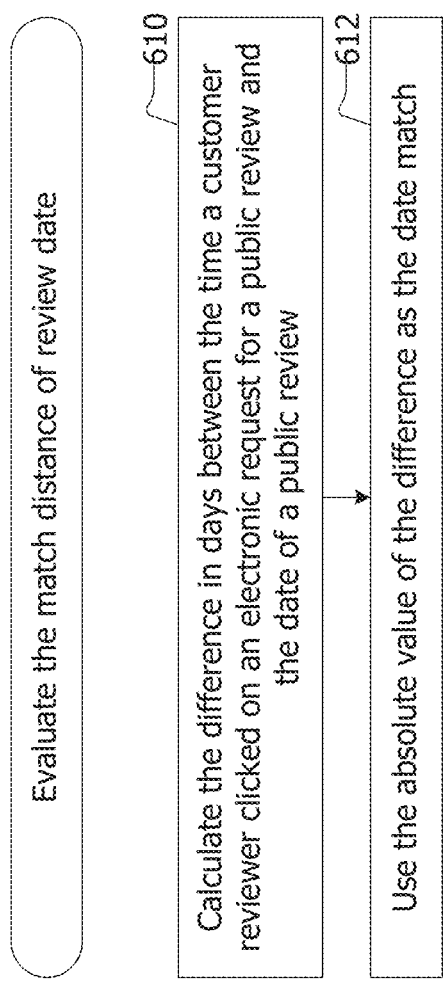
FIG. 6 is a flow chart of the actions taken to evaluate the likelihood of whether the review date of a public review matches the review date of a private review.
Figure 7:
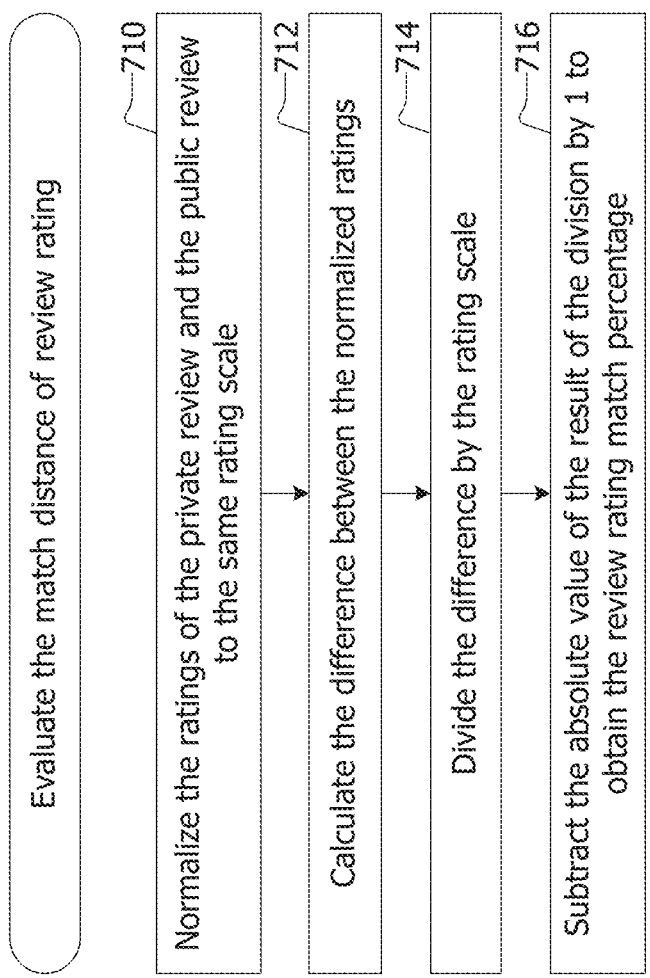
FIG. 7 is a flow chart of the actions taken to evaluate the likelihood of whether the review rating of a public review matches the review rating of a private review.

Referring now to FIG. 3, a flow chart showing the actions taken to evaluate the similarity of two reviews is provided. The system obtains or receives a customer's private review sent to a business and/or public review placed on business website, as shown in block 310. The system evaluates reviews from third party websites according to the following method, as shown in block 320. The system may specifically match third party websites corresponding to the website links included in prompts provided to customers in block 230 of FIG. 2. That is, the system looks where the system prompted the customer to visit and/or to where the system provided a link for the customer to traverse and leave a review.

The system compares four portions of an online review from a third party website to the known customer's private review sent to a business and/or the known public review placed on the business's website to determine if there is a match. The four portions of the public review of the third party website that are analyzed are the text body of the review, the date of the review, the reviewer name, and the overall rating. In some circumstances the customer may have only left a rating and not a text review; in these circumstances, only three portions of a customer review of analyzed. Analytical rules are applied to the complete the evaluation. The following paragraphs explain in detail how this is done.

Referring again to FIG. 3, the system evaluates the match distance of the text body of the reviews, as shown in block 330. If there is no text body portion of a customer review, then this step is skipped. The match distance is a percentage of closeness between the text bodies where the larger the percentage the greater the likelihood there is a match. This is achieved according to the method shown in FIG. 4. The system calculates the distance between a private review and a public review, as shown in block 410. The distance may be calculated as a Levenshtein Distance between the reviews. Other distance functions may be used. The entirety of the text body is used in this evaluation. In another embodiment, in addition or alternatively, the distance between the text body used in a review on a business's public web page and the text body of a review on a third party review website may be calculated. This may be achieved by calculating the Levenshtein Distance between the reviews. Other distance functions may be used. The entirety of the text body is used in this evaluation. The system divides the distance by the greater of the length of each of the two text bodies of the reviews, as shown in block 412. If the result of the division is greater than 1, 1 is used as the adjusted result, as shown in block 414. The result is then subtracted from 1 to obtain the text body match percentage, as shown in block 416. When the result of the division is greater than 1, the text body match is 0%. This evaluation is reflected in the following equation where $M_t$ refers to text body match.

$$M_t = 1 - \text{Min}\left(\frac{\text{Distance(public text, private text)}}{\text{Max(public text length, private text length)}}, 1\right)$$

Referring again to FIG. 3, the system evaluates the match distance of the reviewer name included in the reviews, as shown in block 332. The match distance is a percentage of closeness between the reviewer names where the larger the percentage the greater the likelihood there is a match. This is achieved according to the method shown in FIG. 5. The system calculates the distance between the reviewer name or ID in a private review and a public review, as shown in block 510. This may be achieved by calculating the Levenshtein Distance between the reviewer names or IDs. Other distance functions may be used. In another embodiment, in addition or alternatively, the distance between the name or ID used in a review on a business's public web page and the name or ID of a reviewer used on a third party review website may be calculated. This may be achieved by calculating the Levenshtein Distance between the reviewer names or IDs. Other distance functions may be used. The system divides the distance by the greater of the length of each of the two names/IDs, as shown in block 512 and then, if the result is greater than 1, the number 1 is used as the adjusted result. The result is then subtracted from 1 to obtain the reviewer name match percentage, as shown in block 516. When the result of the division is greater than 1, the text body match is 0%. This evaluation is reflected in the following equation where $M_n$ refers to name match.

$$M_n = 1 - \text{Min}\left(\frac{\text{Distance(public name, private name)}}{\text{Max(public name length, private name length)}}, 1\right)$$

Referring again to FIG. 3, the system evaluates the match distance of the review date of the reviews, as shown in block 334. The match distance is raw number value reflecting the closeness between the review dates where the lower the number the greater the likelihood there is a match. In one embodiment, this is achieved according to the method shown in FIG. 6. The system calculates the difference in days between the time the customer clicked on an electronic request (or prompt) for a public review on a third party review website and the date of a public review, as shown in block 610. In another embodiment, in addition or alternatively, the system calculates the difference in days between the time the reviewer clicked on the electronic request (or prompt) for a public review on a third party review website and the date of a review placed on the business's website. The absolute value of the difference is used, as shown in block 612, so as to account for time zone changes. This is reflected in the following equation where $M_d$ refers to date match.

$$M_d = \text{Absolute(Click through date−Private review date)}$$

In another embodiment, the date match analysis may be made between the date of a public review left on a third party review website and the date of a private review. In yet another embodiment, the date match analysis may be made between the date of a public review left on a third party review website and the date of a review left on a web page of a website maintained by the business.

Referring again to FIG. 3, the system evaluates the match distance of the review rating (or overall rating) of the reviews, as shown in block 336. The match distance is a percentage of closeness between the review ratings where the larger the percentage the greater the likelihood there is a match. This is achieved according to the method shown in FIG. 7. The system normalizes the ratings of the private review and the public review to the same scale, as shown in block 710. The multiple third party review websites use different scales. Although a 5 point or 5 star scale is most popular, others use letter grades, some are out of 100 and others use a 4 point system. In one embodiment, because 5 has been seen to be the most used scale, the ratings are normalized to fit on a 5 point scale. The system calculates the difference between the normalized ratings, as shown in block 712. The difference is then divided by the rating scale, as shown in block 714. In one embodiment the difference is divided by 5. The absolute value of the result of the division is then subtracted from 1 to obtain the review rating match percentage, as shown in block 716. This is reflected in the following equation where $M_r$ refers to rating match.

$$M_r = 1 - \text{Absolute}\left(\frac{\text{Public Review Rating} - \text{Private Review Rating}}{\text{rating scale}}\right)$$

Referring again to FIG. 3, the system applies rules to the matching evaluations, as shown in block 338. In one embodiment, rules are reviewed sequentially. When a review does not include a text body, those rules that determine a match based on the text body, such as Rules 1 and 2 shown below, are skipped. When the rules are reviewed sequentially, when a rule is met, the analysis stops, and a result is provided. A list of example rules and the sequence they are evaluated follows. If a rule is met, a review match is considered likely or highly probable.

| Sequence | Rule |
| --- | --- |
| 1 | $M_t > 50\%$ |
| 2 | $M_t > 30\%$ and $M_n > 50\%$ |
| 3 | $M_n >= 40\%$ and $M_r >= 80\%$ and $M_d <= 5$ |
| 4 | $M_n >= 50\%$ and $M_d <= 3$ |
| 5 | $M_n >= 35\%$ and $M_r >= 80\%$ and $M_d <= 3$ |

The rules and the list may evolve over time to improve accuracy. Types of improvements include fine tuning the percentage thresholds, additional combinations of rules, and ordering of rules. Additional rules may be added for additional languages.

Based on the rules and matching evaluations, the system determines if there was a match, as shown in block 340. If there was a match, the results are stored for later reporting. When reporting and determining what to report, the system may be presented with the situation where there are multiple review matches. When there are multiple review matches, the review having met the earliest sequential rule with the highest matching score is provided as the most likely matching review.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A computing device implemented method for evaluating a customer involvement campaign success rate based on whether a public review matches a private review, the method comprising:
   for each of a plurality of customers
      a server obtaining the private review of a business including
         the server sending a first prompt via email or text message over a network to each of the plurality of customers to leave the private review,
         the server collecting the private review and storing it in a database;
      the server sending a second prompt via email or text message over the network to each of the plurality of customers to leave a public review at a third party website hosted by a third party review server;
      the server obtaining a plurality of public reviews of the business from a plurality of third party websites over the network including
         the server periodically obtaining the public reviews for the business from multiple third party websites over the network via application interfaces (APIs) at the third party websites and
         the server storing the public reviews in the database;
   for each private review in the database, the server evaluating a likelihood the private review matches one of the plurality of public reviews for the business in the database including
      the server evaluating a match distance between text bodies in the public review and the private review,
      the server evaluating a match distance between reviewer names in the public review and the private review,
      the server evaluating a match distance between a review date of the public review and a link click date resulting from an email prompt to submit the public review,
      the server evaluating a match distance between ratings in the public review and the private review,
      the server applying rules to the match distances for the text body, reviewer name, review date, link click date and ratings to determine the likelihood of a match, including the server performing the following sequentially
         when there is both a text body for the private review and the public review, the server checking whether the match distance for the text body is greater than a first system defined percentage,
         when there is both a text body for the private review and the public review, the server checking whether the match distance for the text body is greater than a second system defined percentage and the match distance for reviewer name is greater than a third system defined percentage
         the server checking whether the match distance for reviewer name is greater than a fourth system defined percentage, the match distance for the rating is greater than or equal to a fifth system defined percentage and the match distance for the date is less than or equal to a first system defined number of days
         the server checking whether the match distance for reviewer name is greater than or equal to the first system defined percentage and the match distance for the date is less than or equal to a second system defined number of days
         the server checking whether the match distance for reviewer name is greater than or equal to sixth system defined percentage, the match distance for the rating is greater than or equal to fifth system defined percentage and the match distance for the date is less than or equal to the second system defined number of days;
   the server evaluating the customer involvement campaign success rate based on the likelihood each of the private reviews for the plurality of customers matches one of the public reviews;
   the server improving the rules over time to improve accuracy, including at least two selected from the group including
      fine tuning percentage thresholds,
      providing additional combinations of rules,
      ordering the rules,
      adding additional rules for additional languages;
   the server providing the customer involvement campaign success rate to the business.

2. The method of claim 1 wherein the evaluating a match distance between text bodies in the public review and the private review comprises:
   the server calculating the distance between the text body of the private review and the public review;
   the server dividing the distance by the greater of a length of each of the text bodies of the private review and the public review;
   the server subtracting a result of the dividing from 1 to obtain a text body match percentage, unless the result of the dividing is greater than 1 wherein the body match percentage is 0.

3. The method of claim 2 wherein the distance is calculated using a Levenshtein Distance function.

4. The method of claim 1 wherein the evaluating a match distance between reviewer names in the public review and the private review comprises:
   the server calculating a distance between the reviewer name of the private review and of the public review;
   the server dividing the distance by the greater of a length of each of the review names from the private review and the public review;

the server subtracting a result of the dividing from 1 to obtain a reviewer name match percentage, unless the result of the dividing is greater than 1 wherein the reviewer name match percentage is 0.

5. The method of claim 4 wherein the distance is calculated using a Levenshtein Distance function.

6. The method of claim 1 wherein the evaluating a match distance between review dates of the public review and the private review comprises:
the server calculating a difference in days between a time the customer clicked on an electronic request for the public review and a date of a public review;
the server setting the match distance between review dates to be the absolute of the difference.

7. The method of claim 1 wherein the evaluating a match distance between ratings in the public review and the private review comprises:
the server normalizing the ratings of the private review and the public review to a rating scale;
the server calculating a difference between normalized ratings of the private review and the public review;
the server dividing the difference by the rating scale;
the server subtracting the absolute value of a result of the dividing by 1 to obtain a review rating match percentage.

8. The method of claim 1 further comprising:
the server receiving notification that the customer clicked on a link in the second prompt, including capturing a time and date the customer clicked on the link in the second prompt.

9. A non-transitory storage medium storing a program having instructions which when executed by a processor in a server cause the server to perform operations to evaluate a customer involvement campaign success rate comprising:
for each of a plurality of customers
the server obtaining a private review of a business including
the server sending a first prompt over a network to each of the plurality of customers to leave the private review,
the server collecting on the server the private review and storing it in a database;
the server sending a second prompt over the network to each of the plurality of customers to leave a public review at a third party website;
the server obtaining over the network a plurality of public reviews of the business from a plurality of third party websites via application interfaces (APIs) at the third party websites and storing the public reviews in the database;
for each private review in the database, the server evaluating a likelihood the private review matches one of the plurality of public reviews for the business in the database including
the server evaluating a match distance between text bodies in the public review and the private review,
the server evaluating a match distance between reviewer names in the public review and the private review,
the server evaluating a match distance between a review date of the public review and a link click date resulting from an email prompt to submit the public review,
the server evaluating a match distance between ratings in the public review and the private review,
the server applying rules to the match distances for the text body, reviewer name, review date, link click date and ratings to determine the likelihood of a match, including performing the following sequentially
when there is both a text body for the private review and the public review, the server checking whether the match distance for the text body is greater than a first system defined percentage,
when there is both a text body for the private review and the public review, the server checking whether the match distance for the text body is greater than a second system defined percentage and the match distance for reviewer name is greater than a third system defined percentage
the server checking whether the match distance for reviewer name is greater than a fourth system defined percentage, the match distance for the rating is greater than or equal to a fifth system defined percentage and the match distance for the date is less than or equal to a first system defined number of days
the server checking whether the match distance for reviewer name is greater than or equal to the first system defined percentage and the match distance for the date is less than or equal to a second system defined number of days
the server checking whether the match distance for reviewer name is greater than or equal to sixth system defined percentage, the match distance for the rating is greater than or equal to fifth system defined percentage and the match distance for the date is less than or equal to the second system defined number of days;
the server evaluating the customer involvement campaign success rate based on the likelihood each of the private reviews matches one of the public reviews;
the server improving the rules over time to improve accuracy, including at least two selected from the group including
fine tuning percentage thresholds,
providing additional combinations of the rules,
ordering the rules,
adding additional rules for additional languages;
the server providing the customer involvement campaign success rate to the business.

10. The non-transitory storage medium of claim 9 wherein the evaluating a match distance between text bodies in the public review and the private review comprises:
the server calculating the distance between the text body of the private review and the public review;
the server dividing the distance by the greater of a length of each of the text bodies of the private review and the public review;
the server subtracting a result of the dividing from 1 to obtain a text body match percentage, unless the result of the dividing is greater than 1 wherein the body match percentage is 0.

11. The non-transitory storage medium of claim 10 wherein the distance is calculated using a Levenshtein Distance function.

12. The non-transitory storage medium of claim 9 wherein the evaluating a match distance between reviewer names in the public review and the private review comprises:
the server calculating a distance between the reviewer name of the private review and of the public review;
the server dividing the distance by the greater of a length of each of the review names from the private review and the public review;

the server subtracting a result of the dividing from 1 to obtain a reviewer name match percentage, unless the result of the dividing is greater than 1 wherein the reviewer name match percentage is 0.

13. The non-transitory storage medium of claim 12 wherein the distance is calculated using a Levenshtein Distance function.

14. The non-transitory storage medium of claim 9 wherein the evaluating a match distance between review dates of the public review and the private review comprises:
   the server calculating a difference in days between a time the customer clicked on an electronic request for the public review and a date of a public review;
   the server setting the match distance between review dates to be the absolute of the difference.

15. The non-transitory storage medium of claim 9 wherein the evaluating a match distance between ratings in the public review and the private review comprises:
   the server normalizing the ratings of the private review and the public review to a rating scale;
   the server calculating a difference between normalized ratings of the private review and the public review;
   the server dividing the difference by the rating scale;
   the server subtracting the absolute value of a result of the dividing by 1 to obtain a review rating match percentage.

16. The non-transitory storage medium of claim 9 having further instructions stored thereon which when executed cause the following additional actions to be performed:
   the server receiving notification that the customer clicked on a link in the second prompt, including capturing a time and date the customer clicked on the link in the second prompt.

* * * * *